United States Patent
Stergiou

(10) Patent No.: US 6,612,155 B1
(45) Date of Patent: Sep. 2, 2003

(54) TESTING CONDITION OF INTERNAL COMBUSTION ENGINES BY SAMPLED DETECTION OF GAS LEAKAGE

(75) Inventor: John Stergiou, Broomall, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/974,680

(22) Filed: Oct. 11, 2001

(51) Int. Cl.$^7$ .............................................. G01M 15/00
(52) U.S. Cl. ........................................ 73/49.7; 73/49.7
(58) Field of Search ............................. 123/90.15, 90.16, 123/25 C, 25 D, 520, 516, 518, 519; 73/118.1, 116, 117.2, 117.3, 40, 40.7, 46, 47, 49.7

(56) References Cited

U.S. PATENT DOCUMENTS

| 4,686,638 A | * | 8/1987 | Furuse ........................ 364/558 |
| 4,805,571 A | * | 2/1989 | Humphrey ................... 123/316 |
| 6,148,803 A | * | 11/2000 | Majima et al. ............. 123/520 |

* cited by examiner

Primary Examiner—Kamand Cuneo
Assistant Examiner—Monica D. Harrison
(74) Attorney, Agent, or Firm—Jacob Shuster

(57) ABSTRACT

Operation of an internal combustion engine is terminated with the intake and exhaust valves maintained closed. A pressurized testing gas is then injected into the combustion chamber so that vacuum at different locations on the engine may be sampled to determine location of the highest gas leakage for identifying possible engine defects corresponding thereto.

9 Claims, 2 Drawing Sheets

TESTING CONDITION OF INTERNAL COMBUSTION ENGINES BY SAMPLED DETECTION OF GAS LEAKAGE

The present invention relates in general to testing and diagnosis of internal combustion engines.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The use of compressed air to pressurize the combustion chamber of an internal combustion engine in order to determine the existence of a leak therein, is already known in the art. However, such leak detection method does not identify location of the leak. As to the diagnosis of engine condition throughout in order to schedule preventive maintenance, costly and labor intensive procedures were heretofore involved, often requiring engine disassembly. It is therefore an important object of the present invention to provide for complete and accurate condition diagnosis of an internal combustion engine with respect to leakage defects without costly and labor intensive engine disassembly.

SUMMARY OF THE INVENTION

In accordance with the present invention, operation of an internal combustion engine is terminated by securing its crankshaft against rotation and maintain its intake and exhaust valves closed through timing control means during performance of a testing process instituted by injection of acompressed testing gas. Vacuum tubes are connected to the different sampling locations in the engine for detection of leakage of the testing gas therefrom in order to identify and locate engine defects corresponding to detection of the highest of the leakages at the sampled locations in the engine.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
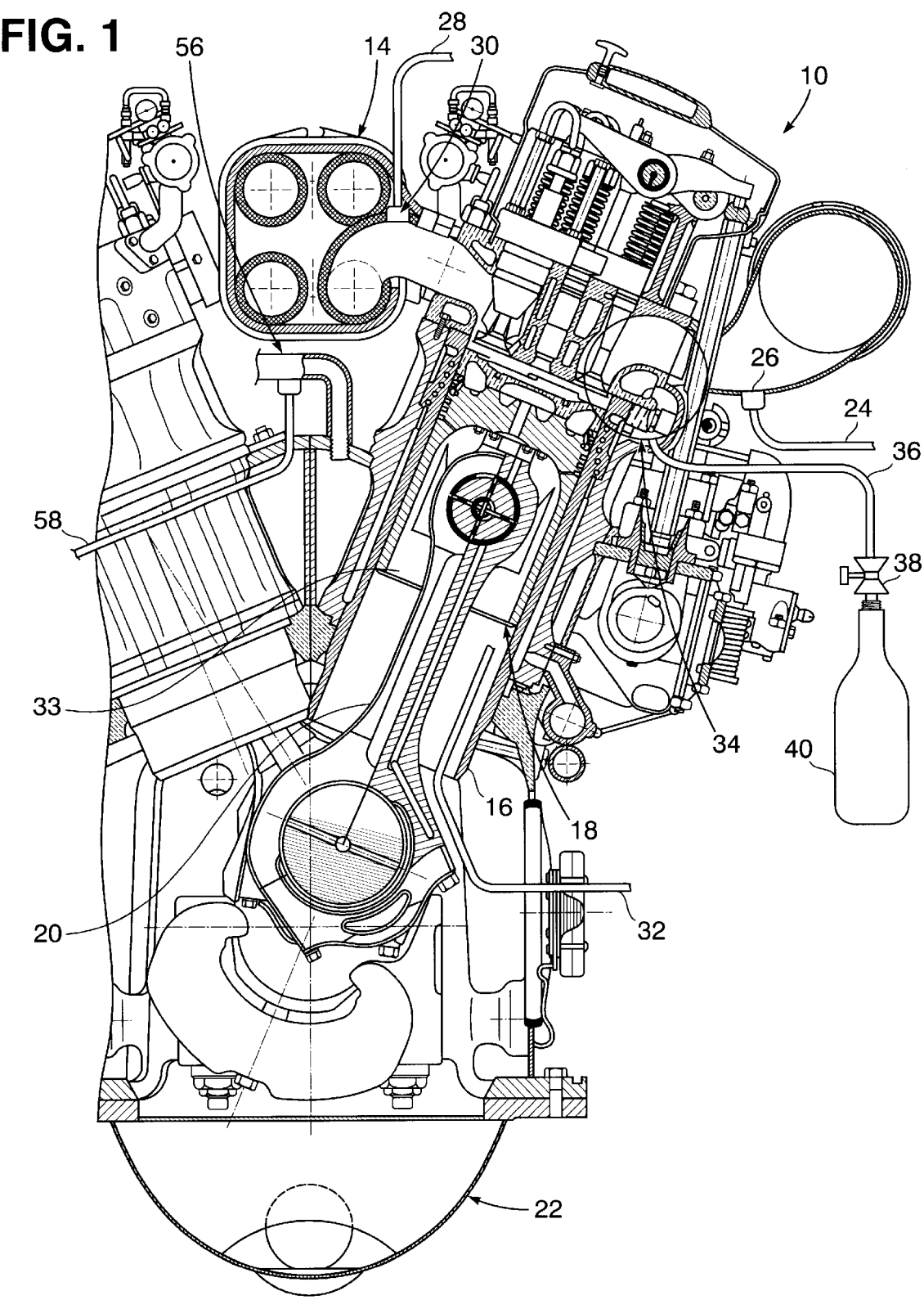
FIG. 1 is a partial section view of an internal combustion engine to which the present invention may be applied by use of certain components shown attached thereto.

Referring now to the drawing in detail, FIG. 1 illustrates a typical internal combustion engine 10 with which the present invention may be associated. Such engine 10 includes for example an intake manifold 12 and an exhaust manifold 14 operatively positioned relative to a cylinder 16 within which a piston 18 is displaced for mechanical transfer of power by means of a piston rod 20 into an engine crankcase 22, as generally known in the art. Pursuant to the present invention, a testing tube 24 is connected at a fixed sampling location 26 to the intake manifold 12, while another testing tube 28 is connected at a fixed sampling location 30 to the exhaust manifold 14. According to one embodiment, yet another testing tube 32 extends to the skirt 33 of the piston 18 enclosed by the engine cylinder 16 and terminates therein at a roving type sampling location adjacent to a lower edge of the piston skirt 33. A petcock valve assembly is disposed on the engine 10 at a location as shown in FIG. 1 for connection of tubing 36 to the cylinder head or injector tube of the engine 10 for supply thereto of an environmentally safe testing gas for leakage testing purposes. The tubing 36 is accordingly connected through a valve 38 to a source 40 of the pressurized testing gas, such as a bottle of compressed gas.

Figure 2:
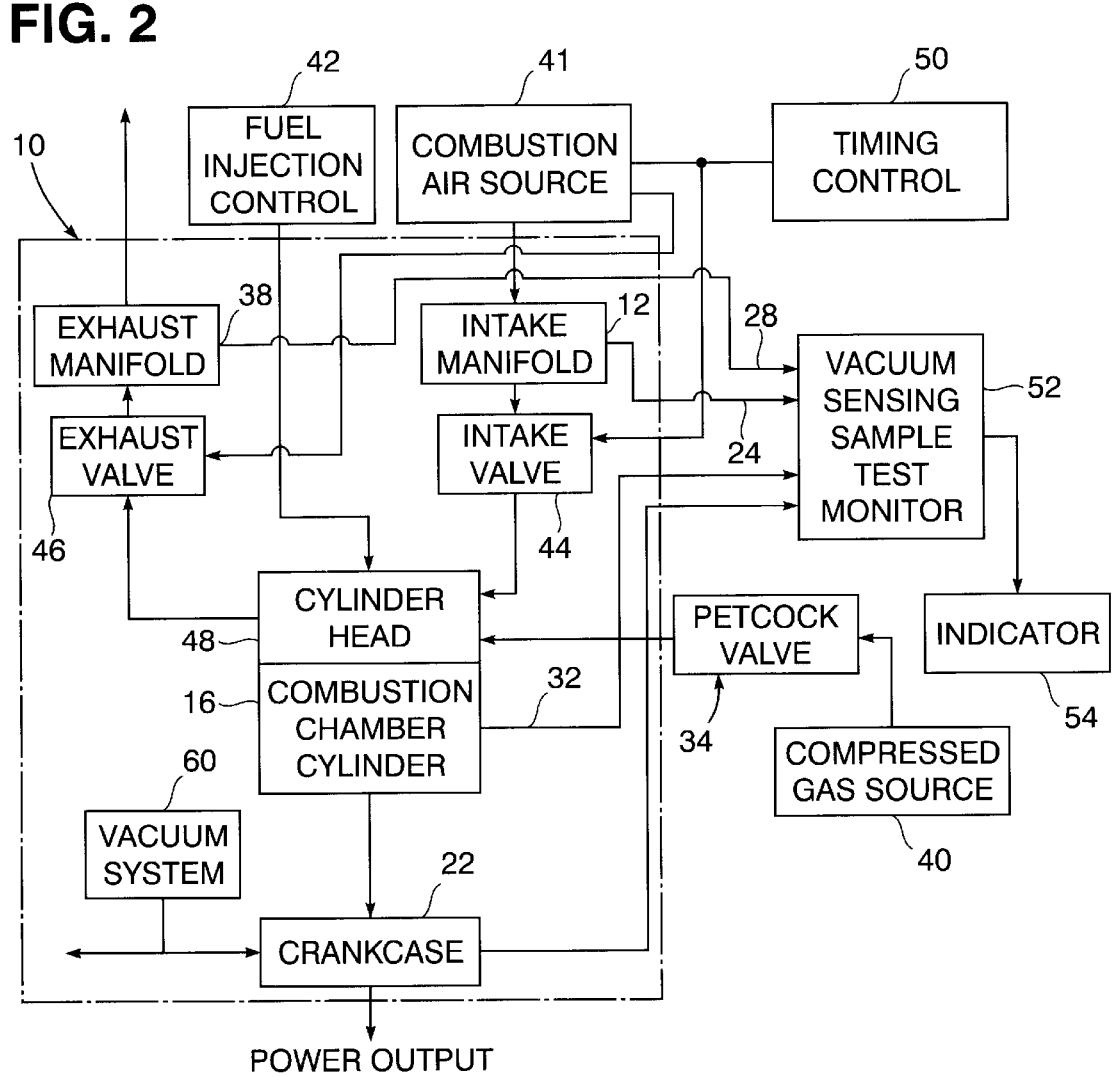
FIG. 2 is a block diagram of the arrangement shown in FIG. 1, in association with a testing system through which the method or process of the present invention may be performed.

Referring now to FIG. 2, the internal combustion engine 10 is diagrammatically illustrated therein corresponding to that shown in FIG. 1, wherein the intake manifold 12 is diagrammatically shown associated with a source 41 of combustion air and fuel injection control 42 through which coordinated opening of an intake valve 44 and an exhaust valve 46 are effected during normal engine operation for respectively feeding expanding piston displacing combustion air through a cylinder head 48, adjacent to the sampling tube attachment locations 26 and 30 into the intake manifold 12 to the piston chamber of the cylinder 16, and discharging combustion gas from the exhaust manifold 14. The intake and exhaust valves 44 and 46 are cyclically closed during normal engine operation under timing conditions imposed by timing control 50. Under such timing conditions associated with closure of the intake and exhaust valves 44 and 46 while the engine crankshaft within the crankcase 22 is secured against rotation to terminate engine operation, the intake and exhaust valves 44 and 46 are maintained closed and the petcock valve assembly 34 is opened to institute a testing process with the supply of the pressurized testing gas from the source 40 to the cylinder head 48, as aforementioned.

With continued reference to FIG. 2, the testing process is performed by vacuum sensing of the testing gas injected into the engine 10 from a plurality of test sampling locations, including the intake manifold 12 at the sampling location 36 from which the testing tube 24 extends, the exhaust manifold 14 at the sampling location 30 from which the testing tube 28 extends and the roving sampling location at the piston skirt 33 internally lining the cylinder 16 from which the testing tube 32 extends. As diagrammed in FIG. 2, sampling of the intake manifold 12, the exhaust manifold 14 and the lining of cylinder 16 for leakage detection is effected through a monitor 52, involving a gas meter with appropriate sensor as generally known in the art.

Although a very small leakage may be detected at all three sampling locations as hereinbefore referred to, the location of the highest magnitude leakage reading obtained will be identified as the defect location through an indicator 54. If the highest leakage detected is located at the intake manifold 12, it reflects that the intake valve 44 is deficient, while detection of highest leakage at the exhaust manifold 14 indicates that the exhaust valve 46 should be inspected for deficiency. If high leakage detection is identified at the piston skirt 33 in the cylinder 16, then the ring pack surrounding the piston cylinder 16 should be inspected. The foregoing testing procedure may be repeated where there are a plurality of piston chamber cylinders 16 associated In accordance with an alternative embodiment of the present invention, test sampling of the piston skirt lining the cylinder 16 through the testing tube 32 is replaced by sampling of the vacuum within the crankcase 22, established by a vacuum system 60. Test sampling is then performed from a fixed sampling location 56 to which a testing tube 58 is connected as shown in FIG. 1, for extension to the monitor 52 as diagrammed in FIG. 2. The testing process otherwise remains the same except for replacing leakage detection from the piston skirt 33 in the cylinder 16 with detection of combustion chamber leakage from the crankcase 22 for comparison with leakages from the intake manifold 12 and the exhaust manifold 14.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an internal combustion engine having intake and exhaust manifolds, a piston combustion chamber and a crankcase at different locations, a process for testing and diagnosing operation of the engine while said operation is terminated and without disassembly to locate engine defects at said different locations, comprising the steps of: sampling gas leak at said different locations within the engine; evaluating said sampled leaks to determine existence of leakage within the engine at said different locations; and identifying from said determined leakage a highest of the sampled leaks corresponding to one of the engine defects at one of the different locations.

2. The process as defined in claim 1, including the further steps of: initiating testing of the engine without inflow to the intake manifold and outflow from the exhaust manifold; and injecting a pressurized testing gas into the combustion chamber from said different locations during said sampling of the leaks.

3. The process as defined in claim 2, wherein said different locations within the engine include the intake and the exhaust manifolds.

4. The process defined in claim 3, wherein said different locations within the engine further includes the combustion chamber.

5. The process defined in claim 4, wherein said different locations within the engine further includes the crankcase.

6. The process as defined in claim 2, wherein said different locations within the engine further includes the combustion chamber.

7. The process as defined in claim 6, wherein said different locations within the engine further includes the crankcase.

8. In combination with an internal combustion engine, a method for testing and diagnosis of engine condition, comprising the steps of: terminating operation of the engine; injecting pressurized testing gas into the engine while the operation thereof is terminated; vacuum sampling of the testing gas injected at different locations in the engine to determine leakage thereat; and identifying one of the different locations at which the determined leakage is highest.

9. In combination with an internal combustion engine, a system for diagnosing operation of the engine during termination of said operation thereof and without disassembly, comprising: injection means for introducing pressurized testing gas into the engine at a plurality of sampling locations therein; monitoring means for detection of leakage of the testing gas at each of said sampling locations; and indicator means connected to the monitoring means for identifying one of the sampling locations at which the leakage of the testing gas is of highest magnitude corresponding to engine defect thereat.

* * * * *